(12) United States Patent
Hara (10) Patent No.: US 10,816,045 B2
(45) Date of Patent: Oct. 27, 2020

(54) CLUTCH STRUCTURE

(71) Applicant: HONDA MOTOR CO., LTD., Tokyo (JP)

(72) Inventor: Hiroaki Hara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 182 days.

(21) Appl. No.: 15/939,286

(22) Filed: Mar. 29, 2018

(65) Prior Publication Data
US 2018/0283470 A1 Oct. 4, 2018

(30) Foreign Application Priority Data
Mar. 29, 2017 (JP) .................................. 2017-065811

(51) Int. Cl.
| | |
|---|---|
| *F16D 25/08* | (2006.01) |
| *F16D 13/58* | (2006.01) |
| *F16D 25/0638* | (2006.01) |
| *F16D 13/52* | (2006.01) |

(52) U.S. Cl.
CPC ........... *F16D 25/082* (2013.01); *F16D 13/58* (2013.01); *F16D 25/0638* (2013.01); *F16D 13/52* (2013.01); *F16D 2300/26* (2013.01)

(58) Field of Classification Search
CPC ..... F16D 25/082; F16D 25/0638; F16D 13/52
See application file for complete search history.

(56) References Cited

U.S. PATENT DOCUMENTS

| | | | | |
|---|---|---|---|---|
| 3,064,780 A | * | 11/1962 | Richards | ............. F16D 25/0638 |
| | | | | 192/85.25 |
| 6,039,160 A | * | 3/2000 | Joppeck | .............. F16D 25/0638 |
| | | | | 192/52.5 |
| 2015/0323060 A1 | * | 11/2015 | Torii | ....................... F16H 57/08 |
| | | | | 475/116 |

FOREIGN PATENT DOCUMENTS

| | | |
|---|---|---|
| CN | 104781590 | 7/2015 |
| JP | 2014-181744 | 9/2014 |
| JP | 2018-151027 | 9/2018 |

OTHER PUBLICATIONS

Chinese Office Action for corresponding CN Application No. 201810104533.2, dated Jul. 25, 2019(w/ English machine translation).
Japanese Office Action for corresponding JP Application No. 2017-065811, dated Nov. 6, 2018 (w/ English machine translation).

* cited by examiner

*Primary Examiner* — Stacey A Fluhart
(74) *Attorney, Agent, or Firm* — Mori & Ward, LLP (57) ABSTRACT

A clutch structure includes a rotary shaft, a cylinder, and a clutch. An outer peripheral fitting surface of the rotary shaft includes an engagement groove. The engagement groove extends in an axial direction along a rotation axis of the rotary shaft. A clutch cover of the clutch includes an engagement protrusion. The engagement protrusion protrudes inwardly in a radial direction with respect to the rotation axis from an inner peripheral surface of an annular inner edge of the clutch cover. The engagement protrusion engages in the engagement groove to hinder the clutch cover from rotating about the rotation axis relative to the rotary shaft.

7 Claims, 5 Drawing Sheets

CLUTCH STRUCTURE

CROSS-REFERENCE TO RELATED APPLICATIONS

The present application claims priority under 35 U.S.C. § 119 to Japanese Patent Application No. 2017-065811, filed Mar. 29, 2017, entitled "Clutch Structure." The contents of this application are incorporated herein by reference in their entirety.

BACKGROUND

1. Field

The present disclosure relates to a clutch structure.

2. Description of the Related Art

In the related art, there is known a clutch structure including a rotary shaft that is rotatably disposed, a cylindrical member that is rotatably disposed on the outside of the rotary shaft in such a manner that the cylindrical member and the rotary shaft are on the same axis, and a clutch portion that switches between a disconnected state in which the rotary shaft is allowed to rotate relative to the cylindrical member and a connected state in which rotation of the rotary shaft relative to the cylindrical member is hindered (see, for example, Japanese Unexamined Patent Application Publication No. 2014-181744).

A clutch portion of a clutch structure described in Japanese Unexamined Patent Application Publication No. 2014-181744 includes a clutch piston that is disposed at the outer periphery of an input shaft, which serves as a rotary shaft, in such a manner as to be capable of sliding in an axial direction and a clutch cover that includes an annular inner edge portion fixed to the outer periphery of the input shaft in such a manner as to form an oil chamber, to which a hydraulic fluid is supplied, between the clutch cover and the clutch piston.

In the related art, a known example of such a method of fixing a clutch cover onto a rotary shaft is a method of fixing a clutch cover onto a rotary shaft by fitting an annular inner edge portion of the clutch cover onto the outer periphery of the rotary shaft and accommodating a circlip (also referred to as a retaining ring) into an annular clip groove. In this case, a space between the rotary shaft and the clutch cover is sealed by an O-ring in order to hermetically seal an oil chamber.

SUMMARY

According to one aspect of the present invention, a clutch structure includes a rotary shaft that is rotatably supported, a cylindrical member that is rotatably disposed on the outside of the rotary shaft in such a manner that the cylindrical member and the rotary shaft are on the same axis, and a clutch portion that switches between a disconnected state in which the cylindrical member is allowed to rotate relative to the rotary shaft and a connected state in which rotation of the cylindrical member relative to the rotary shaft is hindered. The clutch portion includes a clutch piston that is disposed at an outer periphery of the rotary shaft in such a manner as to be capable of sliding in an axial direction, a clutch cover that is fixed to the outer periphery of the rotary shaft in such a manner as to form, between the clutch cover and the clutch piston, an oil chamber to which a hydraulic fluid used for causing the clutch piston to operate is supplied, and a seal member that hermetically seals a space between the rotary shaft and the clutch cover. The clutch cover includes an annular inner edge portion that is fitted onto the outer periphery of the rotary shaft in a fitting direction, which is parallel to the axial direction, and a cover-side contact surface that has a ring-like shape and that rises outward in a radial direction from an end edge of the annular inner edge portion, the end edge facing the fitting direction. The rotary shaft has an outer peripheral fitting surface onto which the annular inner edge portion of the clutch cover is fitted on an outside of the outer peripheral fitting surface, a shaft-side contact surface that rises outward in the radial direction from an end edge of the outer peripheral fitting surface, the end edge facing the fitting direction, and that comes into contact with the cover-side contact surface, an annular clip groove in which a circlip is accommodated, the circlip fixing in place the annular inner edge portion of the clutch cover, which is fitted to the outer peripheral fitting surface and which is in contact with the shaft-side contact surface, by pressing the annular inner edge portion from a side opposite to a side on which the shaft-side contact surface is present, and an engagement groove that is formed in the outer peripheral fitting surface along the axial direction. The clutch cover further includes an engagement protruding portion that protrudes inwardly in the radial direction from an inner peripheral surface of the annular inner edge portion and that engages in the engagement groove in such a manner as to hinder the clutch cover from rotating relative to the rotary shaft.

According to another aspect of the present invention, a clutch structure includes a rotary shaft, a cylinder, and a clutch. The rotary shaft is rotatable about a rotation axis. The rotary shaft includes an outer peripheral fitting surface, a shaft-side contact surface, and an annular clip groove. The outer peripheral fitting surface is provided about the rotation axis and includes an engagement groove extending in an axial direction along the rotation axis. The shaft-side contact surface extends outwardly in a radial direction with respect to the rotation axis from an end edge of the outer peripheral fitting surface in the axial direction. The annular clip groove is provided in an outer periphery of the rotary shaft about the rotation axis and extends in a peripheral direction with respect to the rotation axis such that the outer peripheral fitting surface is between the shaft-side contact surface and the annular clip groove in the axial direction. A circlip is mounted in the annular clip groove. The cylinder is provided on an outside of the rotary shaft in the radial direction. The clutch is to switch between a disconnected state in which the cylinder rotates about the rotation axis relative to the rotary shaft and a connected state in which rotation of the cylinder about the rotation axis relative to the rotary shaft is hindered. The clutch includes a clutch piston and a clutch cover. The clutch piston is provided at the outer periphery of the rotary shaft to be slidable in the axial direction. The clutch cover is provided at the outer periphery of the rotary shaft such that an oil chamber is defined between the clutch cover and the clutch piston. A hydraulic fluid is to be supplied to the oil chamber to slidably move the clutch piston in the axial direction. The clutch cover includes an annular inner edge, a cover-side contact surface, an engagement protrusion, and a packing. The annular inner edge is fitted onto the outer peripheral fitting surface of the rotary shaft such that the annular inner edge is provided on an outside of the outer peripheral fitting surface of the rotary shaft in the radial direction. The circlip presses the annular inner edge in a fitting direction to fix the annular inner edge in place in the axial direction. The fitting direction is one direction from the annular clip groove to the shaft-side contact surface in the axial direction. The cover-side contact surface has a ring shape and extends outwardly in the radial direction from an end edge of an inner peripheral surface of the annular inner edge in the fitting direction. The cover-side contact surface is in contact with the shaft-side contact surface in the axial direction. The engagement protrusion protrudes inwardly in the radial direction from the inner peripheral surface of the annular inner edge. The engagement protrusion engages in the engagement groove to hinder the clutch cover from rotating about the rotation axis relative to the rotary shaft. The packing hermetically seals between the rotary shaft and the clutch cover.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
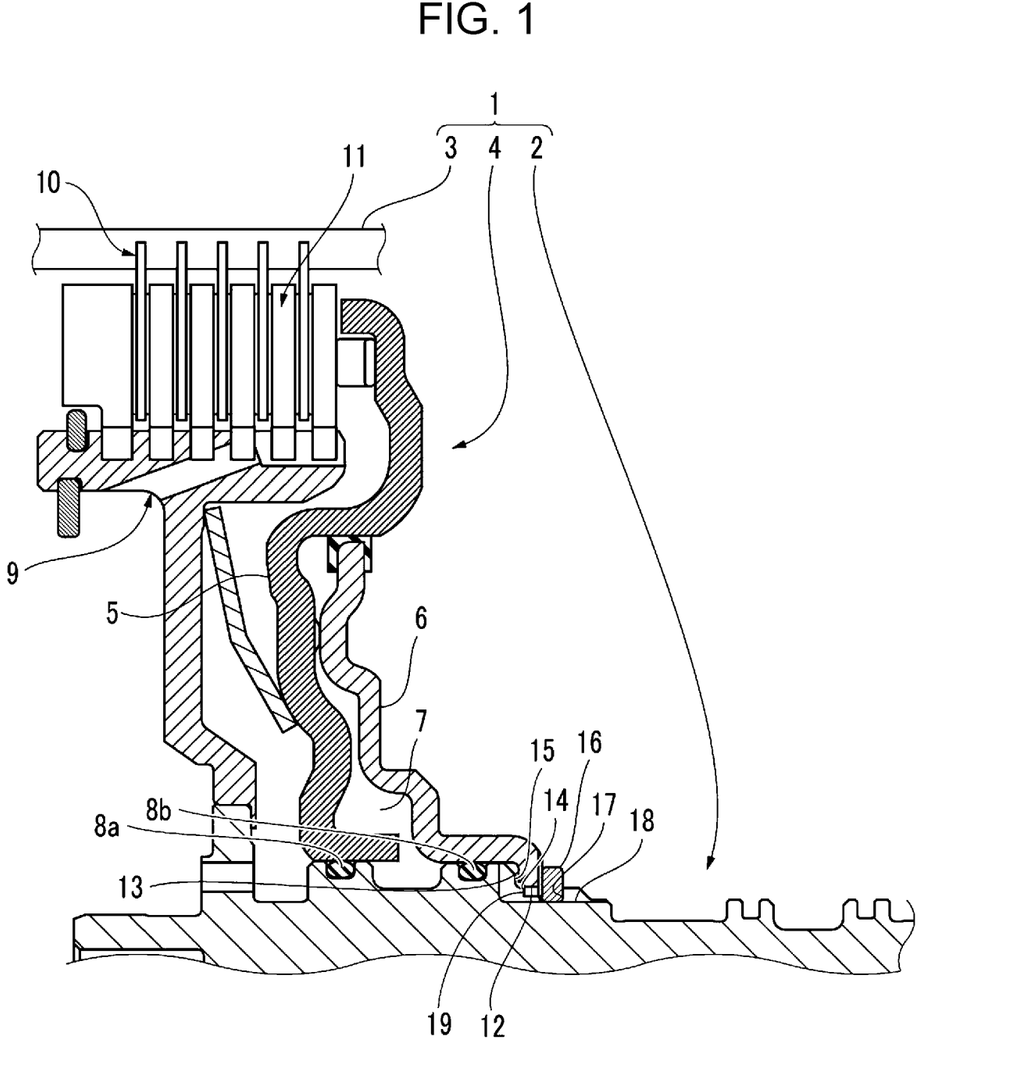
FIG. 1 is a sectional view of a principal portion of a clutch structure according to an embodiment of the present disclosure.

An embodiment of the present disclosure will be described below with reference to the drawings. As illustrated in FIG. 1 an FIG. 2, a clutch structure 1 according to the present embodiment is used in, for example, a transmission mounted on an automobile and includes a rotary shaft 2 that is rotatably supported, an outer drum 3 serving as a cylindrical member (a cylinder) that is rotatably disposed on the outside of the rotary shaft 2 in such a manner that the outer drum 3 and the rotary shaft 2 are on the same axis, and a clutch portion 4 (a clutch) that is interposed between the rotary shaft 2 and the outer drum 3.

The clutch portion 4 switches between a disconnected state in which the rotary shaft 2 is allowed to rotate relative to the outer drum 3 and a connected state in which rotation of the rotary shaft 2 relative to the outer drum 3 is hindered. Hindering the relative rotation between the outer drum 3 and the rotary shaft 2 implies that rotation of the outer drum 3 and rotation of the rotary shaft 2 are synchronized with each other.

The clutch portion 4 includes a clutch piston 5 that is disposed at the outer periphery of the rotary shaft 2 in such a manner as to be capable of sliding in an axial direction and a clutch cover 6 that is fixed to the outer periphery of the rotary shaft 2. The clutch cover 6 forms an oil chamber 7 between the clutch cover 6 and the clutch piston 5, and a hydraulic fluid that is used for causing the clutch piston 5 to operate is supplied to the oil chamber 7. In order to form the oil chamber 7, O-rings 8a and 8b (packing) each of which serves as a seal member are disposed between the rotary shaft 2 and the clutch cover 6.

The following components are disposed in the outer drum 3: an inner hub 9 that is fixed to the rotary shaft 2 in such a manner as to be capable of rotating relative to the outer drum 3 and to be concentric with the outer drum 3, a plurality of outer discs 10 that are disposed on the inner peripheral surface of the outer drum 3 in such a manner as to rotate integrally with one another, a plurality of inner plates 11 that are disposed on the outer peripheral surface of the inner hub 9 in such a manner as to rotate integrally with one another, and the above-mentioned clutch piston 5 that generates friction between the outer discs 10 and the inner plates 11 by pressing the outer discs 10 and that synchronizes rotation of the outer drum 3 and rotation of the inner hub 9 with each other.

The clutch cover 6 includes an annular inner edge portion (an annular inner edge) 12 that is fitted onto the outer periphery of the rotary shaft 2 in a fitting direction, which is parallel to the axial direction, and a cover-side contact surface 13 that has a ring-like shape and that rises outward in a radial direction from an end edge of the annular inner edge portion 12, the end edge facing the fitting direction.

Figure 2:
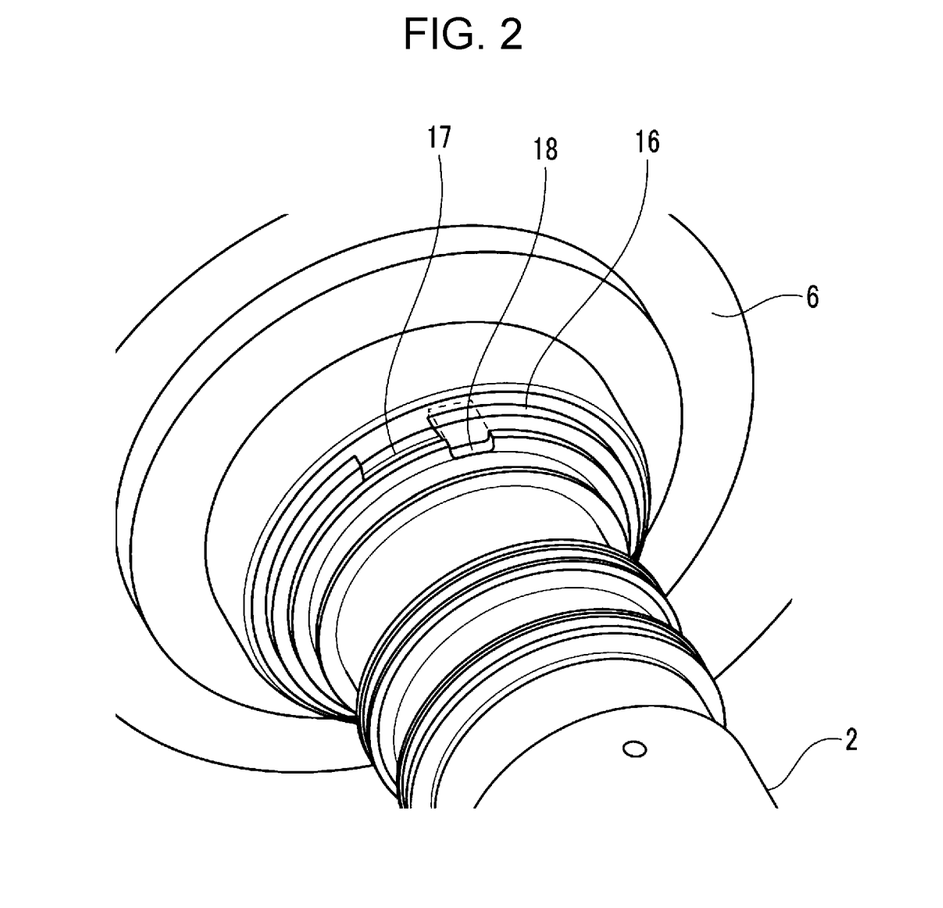
FIG. 2 is a perspective view of a portion of a rotary shaft to which a clutch cover illustrated in FIG. 1 is attached.

The rotary shaft 2 has an outer peripheral fitting surface 14 that has a ring-like shape, a shaft-side contact surface 15, an annular clip groove (a circlip groove) 17, and engagement grooves 18. The annular inner edge portion 12 of the clutch cover 6 is fitted onto the outside of the outer peripheral fitting surface 14. The shaft-side contact surface 15 rises outward in the radial direction from an end edge of the outer peripheral fitting surface 14, the end edge facing the fitting direction, and comes into contact with the cover-side contact surface 13. A circlip 16 that fixes the clutch cover 6 to the rotary shaft 2 is accommodated in the annular clip groove 17. The engagement grooves 18 are formed in the outer peripheral fitting surface 14 along the axial direction. Note that the fitting direction is one way direction of the axial direction from the annular clip groove 17 to the shaft-side contact surface 15.

The circlip 16 fixes in place the annular inner edge portion 12 of the clutch cover 6, which is fitted to the outer peripheral fitting surface 14 and which is in contact with the shaft-side contact surface 15, by pressing the annular inner edge portion 12 against the outer peripheral fitting surface 14 and the shaft-side contact surface 15 from the side opposite to the side on which the shaft-side contact surface 15 is present.

Figure 3:
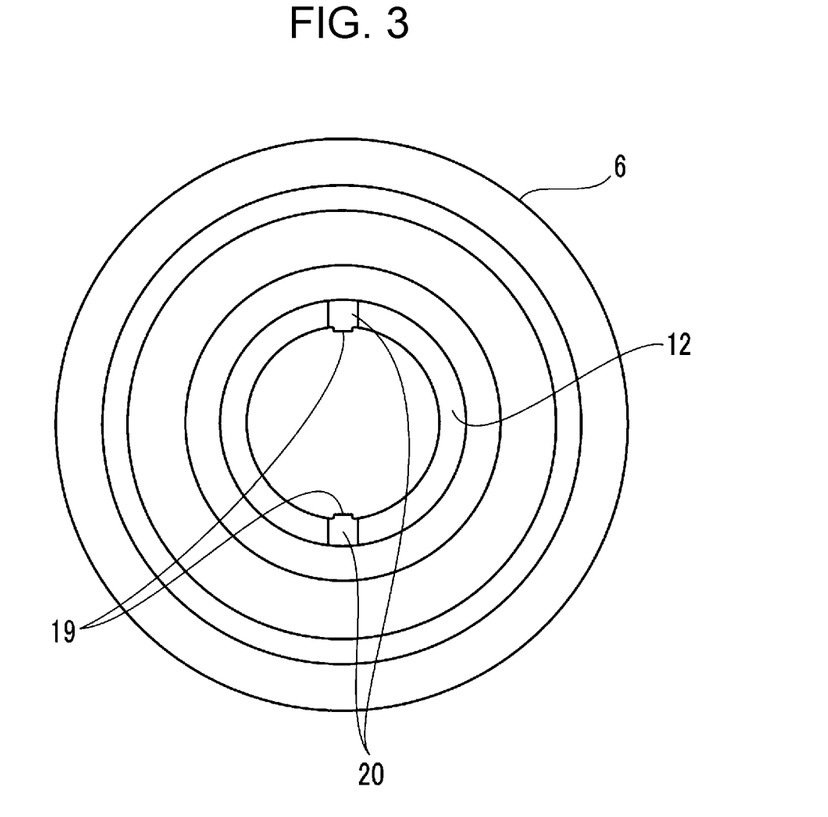
FIG. 3 is a front view illustrating the clutch cover of the clutch structure illustrated in FIG. 1 when viewed from the outside in an axial direction.
Figure 4:
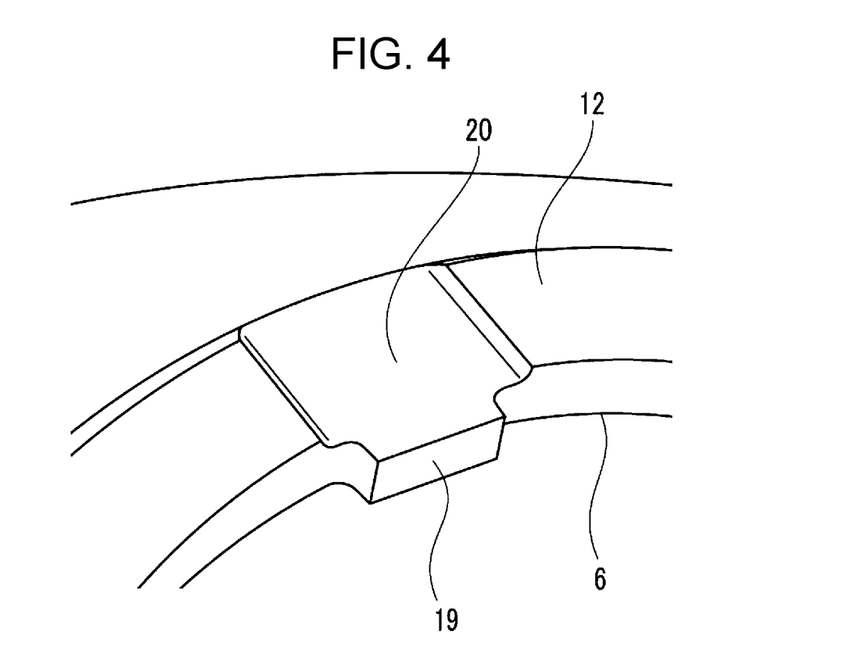
FIG. 4 is a perspective view of a principal portion of the clutch cover illustrated in FIG. 3.

FIG. 3 illustrates the state of the clutch cover 6 when viewed from the outside in the axial direction, and FIG. 4 is a perspective view of a principal portion of the clutch cover 6. As illustrated in FIG. 3 and FIG. 4, the clutch cover 6 further includes engagement protruding portions (engagement protrusions) 19 that protrude inwardly in the radial direction from the inner peripheral surface of the annular inner edge portion 12 and each of which engages in a corresponding one of the engagement grooves 18 in such a manner as to hinder the clutch cover 6 from rotating relative to the rotary shaft 2.

Recesses 20 that prevent the circlip 16 from coming into contact with the clutch cover 6 are each formed in a region of the annular inner edge portion 12 of the clutch cover 6 in which a corresponding one of the engagement protruding portions 19 is present, the region extending in the circumferential direction (the peripheral direction with respect to the axis), or in a region of the annular inner edge portion 12 including the above-mentioned region extending in the circumferential direction.

When mounting the clutch cover 6 onto the rotary shaft 2, in a state where the O-ring 8*b* is accommodated in a corresponding one of annular grooves formed in the outer periphery of the rotary shaft 2, the clutch cover 6 is moved with respect to the rotary shaft 2 from the side opposite to the side on which the clutch piston 5 is disposed while the clutch cover 6 is in a position in which the recesses 20 of the clutch cover 6 face the side opposite to the side on which the clutch piston 5 is disposed, and the annular inner edge portion 12 of the clutch cover 6 is fitted onto the outside of the outer peripheral fitting surface 14 of the rotary shaft 2.

When the above fitting operation is performed, the positional relationship between the clutch cover 6 and the rotary shaft 2 in the circumferential direction is adjusted in such a manner that the engagement protruding portions 19 of the clutch cover 6 are fitted into the corresponding engagement grooves 18 of the rotary shaft 2. In addition, the clutch cover 6 is moved for performing the fitting operation until the cover-side contact surface 13 comes into contact with the shaft-side contact surface 15. In this case, the O-ring 8*b* is crushed by a corresponding portion of the inner peripheral surface of the clutch cover 6, and as a result, a space between the rotary shaft 2 and the clutch cover 6 is hermetically sealed.

Subsequently, the circlip 16 is inserted into the annular clip groove 17 of the rotary shaft 2. As a result, the annular inner edge portion 12 of the clutch cover 6 is pressed against and fixed onto the shaft-side contact surface 15, and the mounting of the clutch cover 6 is completed.

When the clutch structure 1 is caused to operate, since the engagement protruding portions 19 of the clutch cover 6 engage in the corresponding engagement grooves 18 of the rotary shaft 2, relative rotation between the rotary shaft 2 and the clutch cover 6 is hindered. This prevents wear of the O-ring 8*b*, which is disposed between the rotary shaft 2 and the clutch cover 6.

In addition, even in the case where a stress is concentrated at a portion of the annular clip groove 17 due to uneven distribution of the pressure between contact surfaces of the circlip 16 and the annular clip groove 17, in which the circlip 16 is accommodated, generated as a result of an end gap 22 of the circlip 16 forming a step or being twisted, the circlip 16 does not rotate relative to the annular clip groove 17, and thus, a fatigue failure is prevented from occurring in the annular clip groove 17.

Figure 5:
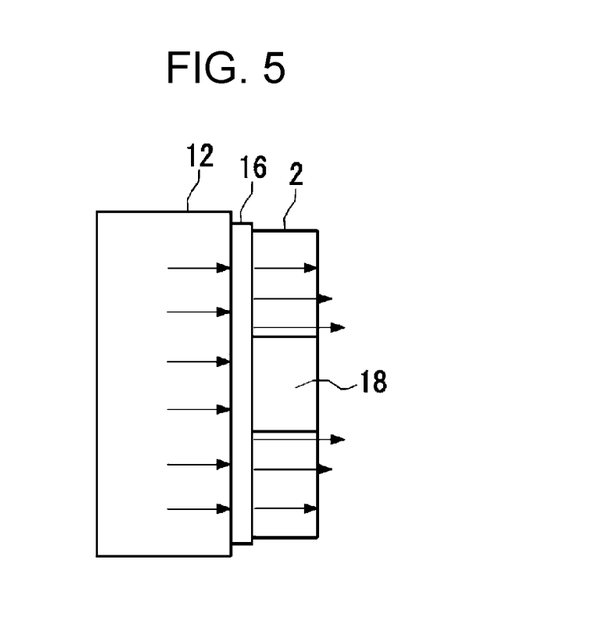
FIG. 5 is a diagram illustrating a problem in the related art.

A load from the clutch cover 6 in the axial direction is applied from the annular inner edge portion 12 to the inner wall of the annular clip groove 17 of the rotary shaft 2, the inner wall being located on the side opposite to the side on which the clutch cover 6 is disposed. As illustrated in FIG. 5, the annular clip groove 17 is not formed in the engagement grooves 18 of the rotary shaft 2, and thus, in the case where the annular inner edge portion 12 does not have the recesses 20, the load is applied more intensively to portions in the vicinity of the engagement grooves 18. Arrows in FIG. 5 indicate a vector that represents the magnitude and direction of the load.

Figure 6:
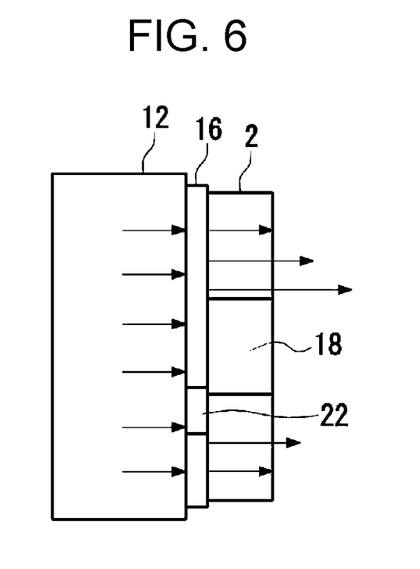
FIG. 6 is a diagram illustrating another problem in the related art.

In addition, the uneven application of the load varies depending on the positional relationship between the end gap 22 of the circlip 16 and one of the engagement grooves 18, and when the end gap 22 is close to one of the engagement grooves 18 as illustrated in FIG. 6, the load is more concentrated at the portion in the vicinity of the engagement groove 18.

Figure 7:
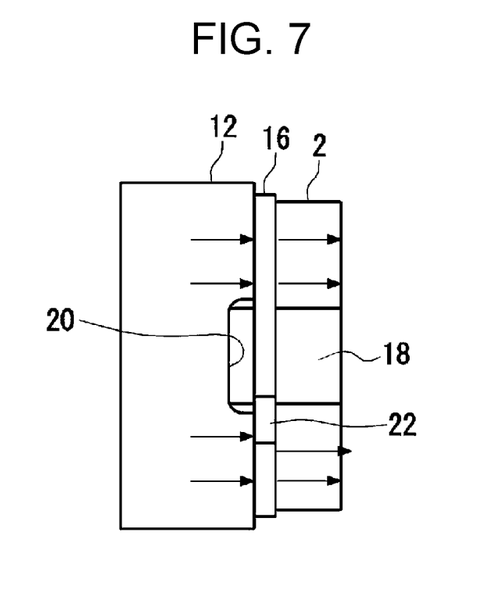
FIG. 7 is a diagram illustrating an advantageous effect of the present disclosure.

In contrast, according to the present embodiment, as illustrated in FIG. 7, the recesses 20, which prevent the circlip 16 from coming into contact with the clutch cover 6, are formed in the regions in the circumferential direction in which the engagement protruding portions 19 of the clutch cover 6, which engage in the corresponding engagement grooves 18, are present. Therefore, in these regions, the load from the clutch cover 6 will not directly applied to a side wall of the annular clip groove 17. As a result, the likelihood of a stress being concentrated at portions of the annular clip groove 17 in the vicinity of the engagement grooves 18 is reduced, so that a fatigue failure is prevented from occurring in the annular clip groove 17.

As described above, according to the present embodiment, since the relative rotation between the rotary shaft 2 and the clutch cover 6 is hindered by the engagement of the engagement protruding portions 19 of the clutch cover 6 and the engagement grooves 18 of the rotary shaft 2, wear of the O-ring 8*b* may be prevented, and a function of the O-ring 8*b* may be maintained. In addition, since the circlip 16 does not rotate relative to the annular clip groove 17, a fatigue failure may be prevented from occurring in the annular clip groove 17.

Since the recesses 20, which prevent the circlip 16 from coming into contact with the clutch cover 6, are formed, the likelihood of a stress being concentrated at the portions of the annular clip groove 17 in the vicinity of the engagement grooves 18 may be reduced, and a fatigue failure may be prevented from occurring in the annular clip groove 17.

Since a fatigue failure may be prevented from occurring in the annular clip groove 17, the diameter of the bottom of the annular clip groove 17 may be reduced, and also the depth of the annular clip groove 17 may be increased. As a result, the engagement allowance of the circlip 16 may be increased. Therefore, the diameter and width of the circlip 16 may be reduced, and a reduction in the size of the clutch structure 1 may be achieved.

A clutch structure according to a first aspect of the present disclosure (which is, for example, a clutch structure 1 according to an embodiment, and the same applies to the following) includes a rotary shaft (which is, for example, a rotary shaft 2 according to the embodiment, and the same applies to the following) that is rotatably supported, a cylindrical member (which is, for example, an outer drum 3 according to an embodiment, and the same applies to the following) that is rotatably disposed on the outside of the rotary shaft in such a manner that the cylindrical member and the rotary shaft are on the same axis, and a clutch portion (which is, for example, a clutch portion 4 according to the embodiment, and the same applies to the following) that switches between a disconnected state in which the cylindrical member is allowed to rotate relative to the rotary shaft and a connected state in which rotation of the cylindrical member relative to the rotary shaft is hindered. The clutch portion includes a clutch piston (which is, for example, a clutch piston 5 according to the embodiment, and the same applies to the following) that is disposed at an outer periphery of the rotary shaft in such a manner as to be capable of sliding in an axial direction, a clutch cover (which is, for example, a clutch cover 6 according to the embodiment, and the same applies to the following) that is fixed to the outer periphery of the rotary shaft in such a manner as to form, between the clutch cover and the clutch piston, an oil chamber (which is, for example, an oil chamber 7 according to the embodiment, and the same applies to the following) to which a hydraulic fluid used for causing the clutch piston to operate is supplied, and a seal member (which is, for example, an O-ring 8b according to the embodiment, and the same applies to the following) that hermetically seals a space between the rotary shaft and the clutch cover. The clutch cover includes an annular inner edge portion (which is, for example, an annular inner edge portion 12 according to the embodiment, and the same applies to the following) that is fitted onto the outer periphery of the rotary shaft in a fitting direction, which is parallel to the axial direction, and a cover-side contact surface (which is, for example, a cover-side contact surface 13 according to the embodiment, and the same applies to the following) that has a ring-like shape and that rises outward in a radial direction from an end edge of the annular inner edge portion, the end edge facing the fitting direction. The rotary shaft has an outer peripheral fitting surface (which is, for example, an outer peripheral fitting surface 14 according to the embodiment, and the same applies to the following) onto which the annular inner edge portion of the clutch cover is fitted on an outside of the outer peripheral fitting surface, a shaft-side contact surface (which is, for example, a shaft-side contact surface 15 according to the embodiment, and the same applies to the following) that rises outward in the radial direction from an end edge of the outer peripheral fitting surface, the end edge facing the fitting direction, and that comes into contact with the cover-side contact surface, an annular clip groove (which is, for example, an annular clip groove 17 according to the embodiment, and the same applies to the following) in which a circlip (which is, for example, a circlip 16 according to the embodiment, and the same applies to the following) is accommodated, the circlip fixing in place the annular inner edge portion of the clutch cover, which is fitted to the outer peripheral fitting surface and which is in contact with the shaft-side contact surface, by pressing the annular inner edge portion from a side opposite to a side on which the shaft-side contact surface is present, and an engagement groove (which is, for example, an engagement groove 18 according to the embodiment, and the same applies to the following) that is formed in the outer peripheral fitting surface along the axial direction. The clutch cover further includes an engagement protruding portion (which is, for example, an engagement protruding portion 19 according to the embodiment, and the same applies to the following) that protrudes inwardly in the radial direction from an inner peripheral surface of the annular inner edge portion and that engages in the engagement groove in such a manner as to hinder the clutch cover from rotating relative to the rotary shaft.

According to the first aspect of the present disclosure, in the related art, an engagement protruding portion of a clutch cover and an engagement groove of a rotary shaft in which the engagement protruding portion engages are not provided, and thus, the clutch cover may sometimes rotate relative to the rotary shaft. In this case, there is a possibility that a seal member disposed between the clutch cover and the rotary shaft will wear and that a function of the seal member will deteriorate. In addition, there is a possibility that a stress will be concentrated at a portion of an annular clip groove due to uneven distribution of the pressure between contact surfaces of a circlip and the annular clip groove, in which the circlip is accommodated, generated as a result of an end gap of the circlip forming a step or being twisted, so that a fatigue failure will occur in the annular clip groove.

Regarding this, according to the first aspect of the present disclosure, since the engagement protruding portion of the clutch cover engages in the engagement groove of the rotary shaft in such a manner as to hinder relative rotation between the rotary shaft and the clutch cover, the above-mentioned wear of the seal member may be prevented, and a fatigue failure may be prevented from occurring in the annular clip groove.

A clutch structure according to a second aspect of the present disclosure, in the first aspect of the present disclosure, a recess (which is, for example, a recess 20 according to the embodiment, and the same applies to the following) that prevents the circlip from coming into contact with the clutch cover is formed in a region of the annular inner edge portion of the clutch cover in which the engagement protruding portion is present, the region extending in a circumferential direction.

According to the second aspect of the present disclosure, a load from the piston cover in the axial direction is applied to an inner wall of the annular clip groove of the rotary shaft, the inner wall being located on the side opposite to the side on which the clutch cover is disposed. The load is applied more intensively to a portion in the vicinity of the engagement groove because the inner wall is not formed in the engagement groove of the rotary shaft. In addition, this uneven application of the load varies depending on the positional relationship between an end gap of the circlip and the engagement groove, and when the end gap is close to the engagement groove, the load is more concentrated at the portion in the vicinity of the engagement groove.

Regarding this, according to the second aspect of the present disclosure, since the recess that prevents the above-mentioned circlip from coming into contact with the clutch cover is formed in the region extending in the circumferential direction, in which the engagement protruding portion of the clutch cover that engages in the engagement groove is present, the load from the clutch cover will not directly applied to a side wall of the annular clip groove in the region.

As a result, stress concentration at the annular clip groove in the vicinity of the engagement groove may be reduced, and a fatigue failure may be prevented from occurring in the annular clip groove. Consequently, the diameter of the bottom of the annular clip groove may be reduced, and also the depth of the annular clip groove may be increased. As a result, the engagement allowance of the circlip may be increased. Therefore, the diameter and width of the circlip may be reduced, and a reduction in the size of the clutch structure may be achieved.

Obviously, numerous modifications and variations of the present invention are possible in light of the above teachings. It is therefore to be understood that within the scope of the appended claims, the invention may be practiced otherwise than as specifically described herein.

What is claimed is:
1. A clutch structure comprising:
a rotary shaft that is rotatably supported;
a cylindrical member that is rotatably disposed on an outside of the rotary shaft in such a manner that the cylindrical member and the rotary shaft are on the same axis; and
a clutch portion that switches between a disconnected state in which the cylindrical member is allowed to rotate relative to the rotary shaft and a connected state in which rotation of the cylindrical member relative to the rotary shaft is hindered,
wherein the clutch portion includes a clutch piston that is disposed at an outer periphery of the rotary shaft in such a manner as to be capable of sliding in an axial direction, a clutch cover that is fixed to the outer periphery of the rotary shaft in such a manner as to form, between the clutch cover and the clutch piston, an oil chamber to which a hydraulic fluid used for causing the clutch piston to operate is supplied, and a seal member that hermetically seals a space between the rotary shaft and the clutch cover, wherein the clutch cover includes an annular inner edge portion that is fitted onto the outer periphery of the rotary shaft in a fitting direction, which is parallel to the axial direction, and a cover-side contact surface that extends in a radial direction from an end edge of the annular inner edge portion, the cover-side contact surface faces in the fitting direction, the cover-side contact surface having a curved shape that protrudes outward in the fitting direction from the end edge of the annular inner edge portion, wherein the rotary shaft has an outer peripheral fitting surface onto which the annular inner edge portion of the clutch cover is fitted on an outside of the outer peripheral fitting surface, a shaft-side contact surface that extends in the radial direction from an end edge of the outer peripheral fitting surface, the shaft-side contact surface facing in a direction opposite to the fitting direction, and comes into contact with the cover-side contact surface, an annular clip groove in which a circlip is accommodated, the circlip fixing in place the annular inner edge portion of the clutch cover, which is fitted to the outer peripheral fitting surface and which is in contact with the shaft-side contact surface, by pressing the annular inner edge portion from a side opposite to a side on which the shaft-side contact surface is present, and an engagement groove that is formed in the outer peripheral fitting surface along the axial direction, and wherein the clutch cover further includes an engagement protruding portion that protrudes inwardly in the radial direction from an inner peripheral surface of the annular inner edge portion and that engages in the engagement groove in such a manner as to hinder the clutch cover from rotating relative to the rotary shaft.

2. The clutch structure according to claim 1,
wherein a recess that prevents the circlip from coming into contact with the clutch cover is formed in a region of the annular inner edge portion of the clutch cover in which the engagement protruding portion is present, the region extending in a circumferential direction.

3. The clutch structure according to claim 1,
the annular clip groove has a radially innermost bottom surface that is at a same radial distance as a radially innermost surface of the engagement groove.

4. A clutch structure comprising:
a rotary shaft rotatable about a rotation axis, the rotary shaft comprising:
an outer peripheral fitting surface provided about the rotation axis and including an engagement groove extending in an axial direction along the rotation axis;

a shaft-side contact surface extending in a radial direction with respect to the rotation axis from an end edge of the outer peripheral fitting surface in the axial direction; and an annular clip groove provided in an outer periphery of the rotary shaft about the rotation axis and extending in a peripheral direction with respect to the rotation axis such that the outer peripheral fitting surface is between the shaft-side contact surface and the annular clip groove in the axial direction, a circlip being mounted in the annular clip groove;

a cylinder provided on an outside of the rotary shaft in the radial direction; and a clutch to switch between a disconnected state in which the cylinder rotates about the rotation axis relative to the rotary shaft and a connected state in which rotation of the cylinder about the rotation axis relative to the rotary shaft is hindered, the clutch comprising:

a clutch piston provided at the outer periphery of the rotary shaft to be slidable in the axial direction; and a clutch cover provided at the outer periphery of the rotary shaft such that an oil chamber for a hydraulic fluid is defined between the clutch cover and the clutch piston, the clutch cover comprising:

an annular inner edge fitted onto the outer peripheral fitting surface of the rotary shaft such that the annular inner edge is provided on an outside of the outer peripheral fitting surface of the rotary shaft in the radial direction, the circlip pressing the annular inner edge in a fitting direction to fix the annular inner edge in place in the axial direction, the fitting direction being one direction from the annular clip groove to the shaft-side contact surface in the axial direction;

a cover-side contact surface extending in a radial direction from an end edge of the annular inner edge portion, the cover-side contact surface faces in the fitting direction, the cover-side contact surface having a curved shape that protrudes outward in the fitting direction from the annular inner edge, the cover-side contact surface being in contact with the shaft-side contact surface in the axial direction; and an engagement protrusion protruding inwardly in the radial direction from the inner peripheral surface of the annular inner edge, the engagement protrusion engaging in the engagement groove to hinder the clutch cover from rotating about the rotation axis relative to the rotary shaft; and a packing hermetically sealing between the rotary shaft and the clutch cover.

5. The clutch structure according to claim 4,
wherein a recess that prevents the circlip from coming into contact with the clutch cover is provided in a region of the annular inner edge of the clutch cover in which the engagement protrusion is provided, the region extending in the peripheral direction.

6. The clutch structure according to claim 4,
the annular clip groove has a radially innermost bottom surface that is at a same radial distance as a radially innermost surface of the engagement groove.

7. A clutch structure comprising:
a rotary shaft that is rotatably supported;
a cylindrical member that is rotatably disposed on an outside of the rotary shaft in such a manner that the cylindrical member and the rotary shaft are on the same axis; and a clutch portion that switches between a disconnected state in which the cylindrical member is allowed to rotate relative to the rotary shaft and a connected state in which rotation of the cylindrical member relative to the rotary shaft is hindered, wherein the clutch portion includes
- a clutch piston that is disposed at an outer periphery of the rotary shaft in such a manner as to be capable of sliding in an axial direction,
- a clutch cover that is fixed to the outer periphery of the rotary shaft in such a manner as to form, between the clutch cover and the clutch piston, an oil chamber to which a hydraulic fluid used for causing the clutch piston to operate is supplied, and
- a seal member that hermetically seals a space between the rotary shaft and the clutch cover, wherein the clutch cover includes
- an annular inner edge portion that is fitted onto the outer periphery of the rotary shaft in a fitting direction, which is parallel to the axial direction, and
- a cover-side contact surface that has a ring-like shape and that rises outward in a radial direction from an end edge of the annular inner edge portion, wherein the rotary shaft has
- an outer peripheral fitting surface onto which the annular inner edge portion of the clutch cover is fitted on an outside of the outer peripheral fitting surface,
- a shaft-side contact surface that rises outward in the radial direction from an end edge of the outer peripheral fitting surface, the end edge comes into contact with the cover-side contact surface,
- an annular clip groove in which a circlip is accommodated, the circlip fixing in place the annular inner edge portion of the clutch cover, which is fitted to the outer peripheral fitting surface and which is in contact with the shaft-side contact surface, by pressing the annular inner edge portion from a side opposite to a side on which the shaft-side contact surface is present, and
- an engagement groove that is formed in the outer peripheral fitting surface along the axial direction, wherein the clutch cover further includes an engagement protruding portion that protrudes inwardly in the radial direction from an inner peripheral surface of the annular inner edge portion and that engages in the engagement groove in such a manner as to hinder the clutch cover from rotating relative to the rotary shaft, wherein the clutch cover and the clutch piston can contact each other in the axial direction in the disconnected state in which relative rotation between the cylindrical member and the rotary shaft is allowed, and wherein the annular inner edge portion of the clutch cover is provided with a recess that prevents the circlip from coming into contact with the clutch cover in a circumferential range in which the engagement protruding portion is present.

* * * * *